No. 674,295. Patented May 14, 1901.
T. EWAN & J. PFLEGER.
PROCESS OF MAKING ALKALINE AMIDS.
(Application filed Sept. 21, 1900.)
(No Model.)
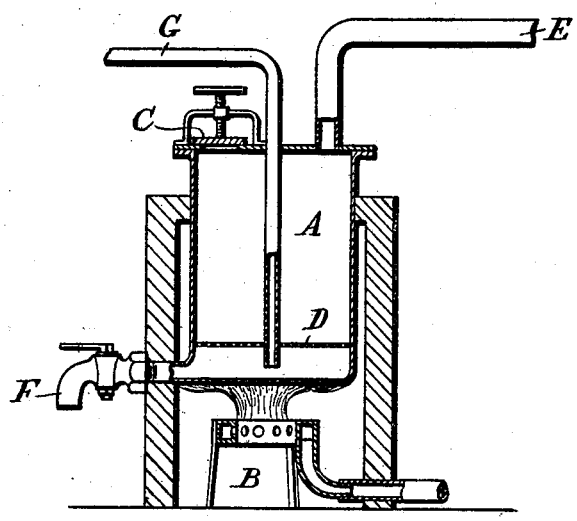
WITNESSES
INVENTORS.

UNITED STATES PATENT OFFICE.

THOMAS EWAN, OF BIRMINGHAM, ENGLAND, AND JOHANNES PFLEGER, OF FRANKFORT-ON-THE-MAIN, GERMANY.

PROCESS OF MAKING ALKALINE AMIDS.

SPECIFICATION forming part of Letters Patent No. 674,295, dated May 14, 1901.

Application filed September 21, 1900. Serial No. 30,688. (No specimens.)

*To all whom it may concern:*

Be it known that we, THOMAS EWAN, a subject of the Queen of Great Britain, residing at Oldbury, Birmingham, England, and JOHANNES PFLEGER, a subject of the German Emperor, residing at Frankfort-on-the-Main, Germany, have invented a certain new and useful Improved Process for the Manufacture or Preparation of Alkaline Amids, of which the following is a specification.

This invention relates to an improved process for the manufacture or preparation of alkaline amids, particularly of sodium amid.

According to this invention the melted alkali metal is maintained at a temperature above the melting-point of the alkali metal, but below the point of dissociation of the amid, and the dry ammonia-gas is caused to rise in this melted alkali metal in bubbles or divided streams and so rapidly that while the decomposition of the ammonia into nitrogen and hydrogen is practically avoided the heat generated by the reaction suffices to maintain the temperature requisite for the continuance of the process. Hitherto either the alkali metal has been heated in an ammoniacal atmosphere or ammonia has been conducted over the melted metal in a somewhat slow current, while external heat was constantly applied. As under these circumstances the ammonia can act only on the surface of the alkali metal, the reaction is a very slow one and a substantial portion of the ammonia becomes decomposed into nitrogen and hydrogen without having entered into reaction with the alkali metal, with the result that the amount of ammonia which has to be used is considerably in excess of what is theoretically needed. Besides this it has not been hitherto known that the formation of amid from Na and $NH_3$ can be so carried out that the heat generated by the reaction will be sufficient to keep the bath at the necessary temperature without applying external heat. The apparatus hitherto employed has been very expensive and complicated and has needed a most careful supervision Unless the amount of external heat applied was controlled with the utmost accuracy the loss of ammonia by decomposition was apt to become so considerable as to preclude the commercial use of the process. The process according to this invention overcomes these drawbacks. The reaction is a rapid one and any loss of ammonia is obviated. The cost of the simple apparatus required is very small. The operations call for no inconvenient supervision or control, inasmuch as it is possible to regulate and maintain the temperature necessary for the reaction by the speed at which the liquefied metal is supplied with ammonia without supplying any external heat.

A simple form of apparatus, but one which has been found to work satisfactorily for a limited output, is illustrated in the accompanying drawing, in which—

A is the vessel for holding the molten alkali metal. Said vessel is heated by a burner B or other source of heat and is provided with a charging-hole C and a sieve or perforated false bottom D, through which passes the feed-pipe G for the ammonia-gas. A discharge-pipe E for the escape of the hydrogen set free during the reaction and a discharge-tap F for the alkaline amid are also provided.

The operation is as follows: When the alkaline metal is in a molten condition, the ammonia-gas is admitted under pressure through pipe G, and such gas rising through the sieve or perforated bottom D is finely divided and passes through the molten metal in the form of small streams or bubbles and the reaction immediately commences. If care be taken that the supply of ammonia is sufficiently rapid, the effect of the reaction will be that practically the whole of the ammonia will be converted into amid by combining with the alkali metal and that very little of the ammonia will be decomposed. Free ammonia will not appear above the surface of the metal until after the whole of the metallic sodium has been transformed into amid. Therefore the appearance of considerable quantities of free ammonia at the surface is an indication of the termination of the reaction. Another indication of this is the rapid fall of the temperature of the material. In order to secure these favorable results, it is advisable to bring the amount of ammonia supplied in a given unit of time into a predetermined relation to the total quantity of the available alkali metal.

By experiment it has been found that advantageous results will be attained when about six kilograms of hot melted sodium are acted upon by one kilogram of ammonia per hour.

In conducting ammonia over the melted sodium as hitherto practiced if a given velocity in the flow of the ammonia be exceeded a large proportion of the ammonia escapes unused, while decomposition of ammonia still goes on. In the improved process according to this invention even if the admission of ammonia-gas to the melted alkali metal be very rapid only traces of the ammonia escape and decomposition of ammonia becomes steadily less, as the velocity of the ammonia-gas increases and practically ceases altogether at a certain velocity of feed.

It will be seen that the process according to this invention as compared with those hitherto employed possesses very material economical and commercial advantages, among which may be mentioned, first, the ammonia is utilized very nearly to the theoretical extent; second, the apparatus required is considerably simplified; third, the output is increased and the operations are rendered far more simple, and, fourth, a considerable saving is effected in the expenditure of fuel.

Instead of pure sodium the less expensive alloys of sodium with other metals may be used. In this case the amid as it forms will be deposited over the residual metal.

What we claim is—

1. The process of manufacture or preparation of alkaline amids consisting in passing a rapid current of ammonia-gas into the interior of melted alkali metal, so that the ammonia-gas is caused to rise through the alkali metal in a finely-divided condition substantially as described.

2. The process of manufacture or preparation of alkaline amids consisting in passing a current of ammonia-gas into the interior of melted alkali metal in about the proportion of one kilogram of ammonia per hour to six kilograms of alkaline metal substantially as described.

3. The process of manufacture or preparation of alkaline amids consisting in passing a current of ammonia into the interior of melted alkali metal at such a speed and in such volume that the alkaline metal and amid will be maintained at the necessary temperature by the heat of reactions substantially as described.

In testimony whereof we have hereunto set our hands in the presence of the subscribing witnesses.

THOS. EWAN.
JOHANNES PFLEGER.

Witnesses to the signature of Thomas Ewan:
THOS. J. MACKENZIE,
JAMES MCINTOSH.

Witnesses to the signature of Johannes Pfleger:
H. KÖHLER,
ADOLF SCHLAUD.